United States Patent
Yoon

(10) Patent No.: US 9,386,504 B2
(45) Date of Patent: Jul. 5, 2016

(54) ENERGY-EFFICIENT NETWORK PROTOCOL AND NODE DEVICE FOR SENSOR NETWORKS

(75) Inventor: Chang-June C. J. Yoon, Edison, NJ (US)

(73) Assignee: Exelis, Inc., McLean, VA (US)

( * ) Notice: Subject to any disclaimer, the term of this patent is extended or adjusted under 35 U.S.C. 154(b) by 337 days.

(21) Appl. No.: 12/748,558

(22) Filed: Mar. 29, 2010

(65) Prior Publication Data

US 2010/0182901 A1 Jul. 22, 2010

Related U.S. Application Data

(62) Division of application No. 11/085,655, filed on Mar. 22, 2005, now Pat. No. 7,729,285.

(51) Int. Cl.
| | | |
|---|---|---|
| *H04L 12/28* | (2006.01) | |
| *H04W 40/28* | (2009.01) | |
| *H04W 40/10* | (2009.01) | |
| *H04W 52/02* | (2009.01) | |
| *H04W 56/00* | (2009.01) | |

(52) U.S. Cl.
CPC .............. *H04W 40/28* (2013.01); *H04W 40/10* (2013.01); *H04W 52/0219* (2013.01); *H04W 56/00* (2013.01); *Y02B 60/50* (2013.01)

(58) Field of Classification Search
CPC ................................. H04L 41/12; H04L 45/02
USPC ......................................................... 370/217
See application file for complete search history.

(56) References Cited

U.S. PATENT DOCUMENTS

| | | |
|---|---|---|
| 6,628,620 B1 | 9/2003 | Cain |
| 6,662,229 B2 | 12/2003 | Passman et al. |
| 6,901,275 B1 | 5/2005 | Aoyagi |
| 7,106,703 B1 * | 9/2006 | Belcea ................ H04W 40/08 370/310 |
| 2002/0061009 A1 * | 5/2002 | Sorensen ....................... 370/351 |
| 2002/0161751 A1 | 10/2002 | Mulgund et al. |

(Continued)

FOREIGN PATENT DOCUMENTS

| | | |
|---|---|---|
| EP | 1324532 A2 | 7/2003 |
| WO | 2004/059928 A1 | 7/2004 |

(Continued)

OTHER PUBLICATIONS

Akyildiz, I., et al., "A Survey on Sensor Networks," IEEE Communications Magazine, Aug. 2002; pp. 102-114.

(Continued)

*Primary Examiner* — Muthuswamy Manoharan
(74) *Attorney, Agent, or Firm* — Edell, Shapiro & Finnan LLC

(57) ABSTRACT

An "on-demand" approach for a routing protocol for a wireless network that achieves balanced energy consumption among all participating nodes in the network. Synchronization messages transmitted by nodes associated with an upstream node include local node information (LNI) that a node can use to repair or bypass a lost upstream node in a real or virtual (temporary) manner depending upon the local node's battery level. Only if a repair process fails will a global re-organization (Re-Org) be initiated. The LNI also allows for nodes having lower power availability (battery level) not to transmit the LNI so that unaffiliated node(s) can select an upstream node having more power availability thereby extending network life.

13 Claims, 10 Drawing Sheets

(56) References Cited

U.S. PATENT DOCUMENTS

| | | | |
|---|---|---|---|
| 2003/0061176 | A1 | 3/2003 | Hoar |
| 2003/0099221 | A1 | 5/2003 | Rhee |
| 2003/0195019 | A1 | 10/2003 | Litwin |
| 2004/0003111 | A1 | 1/2004 | Maeda et al. |
| 2004/0203834 | A1 | 10/2004 | Mahany |
| 2005/0047390 | A1* | 3/2005 | Park et al. .............. 370/351 |
| 2005/0143007 | A1 | 6/2005 | Guy et al. |
| 2005/0157698 | A1 | 7/2005 | Park et al. |
| 2006/0098606 | A1 | 5/2006 | Pandey et al. |
| 2006/0133328 | A1 | 6/2006 | Levendel et al. |
| 2006/0187866 | A1* | 8/2006 | Werb et al. .............. 370/311 |
| 2007/0258508 | A1* | 11/2007 | Werb et al. .............. 375/140 |
| 2008/0062941 | A1* | 3/2008 | Rhee et al. .............. 370/338 |
| 2008/0170550 | A1* | 7/2008 | Liu et al. .............. 370/338 |

FOREIGN PATENT DOCUMENTS

| | | |
|---|---|---|
| WO | 2004/109966 A3 | 12/2004 |
| WO | 2005/010214 A3 | 2/2005 |
| WO | 2006/068976 A1 | 6/2006 |

OTHER PUBLICATIONS

Toh, C.-K., "Maximum Battery Life Routing to Support Ubiqiutous Mobile Computing in Wireless Ad Hoc Networks," IEEE Communications Magazine, Jun. 2001; pp. 138-147.

Heinzelman, W.B. et al., "An Applications-Specific Protocol Architecture for Wireless Microsensor Networks," IEEE Transactions on Wireless Communications, vol. 1, No. 4, Oct. 2002; pp. 660-670.

Manjesjwar, A., et al., "TEEN: A Routing Protocol for Enhanced Efficiency in Wireless Sensor Networks," Parallel and Distributed Processing Symposium, Proceedings 15th International, Apr. 23-27, 2001; 29 pages.

Lindsey, S., et al., "Pegasis: Power Efficient Gathering in Sensor Information Systems," Aerospace Conference Proceedings, 2003, IEEE, vol. 3, Mar. 9-16, 2002; 7 pages.

Kulik, J., et al., "Negotiation-based Protocols for Disseminating Information in Wireless Sensor Networks," Proc. of the 5th Annual ACM/IEEE International Conf. on Mobile Computing and Networking 1999; pp. 1-15.

Itanagonwiwat, C. et al., "Directed Diffusion for Wireless Sensor Networking," IEEE/ACM Transactions on Networking, vol. 11, No. 1, Feb. 2003; pp. 2-16.

Ye, F. et al., "A Scalable Solution to Minimum Cost Forwarding in Large Sensor Networks," Proc. of the 10th International Conf. on Computer Communications and Networks, 2001; 6 pages.

Servetto, S., et al., "Constrained Random Walks on Random Graphs: Routing Algorithms for Large Scale Wireless Sensor Networks," Proc. of the 1st ACM International Workshop on Wireless Sensor Networks and Applications, Atlanta, Georgia, 2002; 10 pages.

Braginksy, D., et al., "Rumor Routing Algorithm for Sensor Networks," Proc. of the 1st ACM International Workshop on Wireless Sensor Networks and Applications, Atlanta, Georgia, 2002; 12 pages.

Woo, K., et al., "Non-Blocking, Localized Routing Algorithm for Balanced Energy Consumption in Mobile Ad Hoc Networks," Modeling, Analysis and Simulation of Computer and Telecommunication Systems, 2001; Proceedings of the 9th International Symposium, Aug. 15-18, 2001; pp. 1-17.

Sohrabi, K., "Methods for Scalable Self-Assembly of Ad Hoc Wireless Sensor Networks," IEEE Transactions on Mobile Computing, vol. 3, No. 4, Oct.-Dec. 2004; 9 pages.

* cited by examiner

ENERGY-EFFICIENT NETWORK PROTOCOL AND NODE DEVICE FOR SENSOR NETWORKS

RELATED APPLICATION

This application is a divisional of U.S. application Ser. No. 11/085,655, filed Mar. 22, 2005, entitled "Energy-Efficient Network Protocol and Node Device for Sensor Networks," and is related to commonly assigned and co-pending U.S. application Ser. No. 11/007,259, filed Dec. 9, 2004, entitled "Energy-Efficient Medium Access Control Protocol and System for Sensor Networks," the entirety of which is incorporated herein by reference.

STATEMENT REGARDING FEDERALLY SPONSORED RESEARCH OR DEVELOPMENT

This invention was made with U.S. Government support. The U.S. Government may have certain rights in the invention.

FIELD OF THE INVENTION

The present invention relates to an energy-efficient medium access control (MAC) protocol for a communication network, such as an unmanned ground sensor (UGS) network.

BACKGROUND OF THE INVENTION

Energy efficiency is a critical issue for battery-operated unmanned ground sensor (UGS) devices. Specifically, in a UGS network where each node is responsible for forwarding data packets from neighboring nodes to an upstream node, care has to be taken not only to reduce the overall energy consumption of all associated nodes, but also to balance battery levels (power availability) of each of the nodes. Unbalanced energy usage will result in faster node failures in overloaded nodes, which in turn may lead to network partitioning and reduced network lifetime.

Generally, existing energy-aware algorithms assume a static network. Additionally, a node must wait until all possible paths have been evaluated based on given energy-aware metrics before selecting the best routing path. Conventional methods of finding a routing path would require a relatively long period of time for collection, and continuous updating thereafter, of the global topology knowledge.

Many sensor routing protocols have been proposed based on modifications to existing ad hoc network protocols. Generally, sensor routing protocols can be classified into three categories: one-hop, flat and cluster-based hierarchical protocols. In one-hop protocols, a sensor node sends data directly to the ultimate data collection device, called a sink This is not only expensive in terms of energy consumption, but it is also impractical for many applications because sensor nodes have limited transmission range. Flat protocols involve a source node transmitting data to the sink by forwarding its data to one of its neighbors which is closer to the sink Thus, data travels from the source to sink by "hopping" from one node to another until it arrives at the destination. Some flat protocols use optimization techniques to enhance the energy efficiency of the devices in the network. Although these optimization techniques improve the performance of this model, it is still a flat model that exhibits high latency. A cluster-based routing protocol groups sensor nodes to efficiently relay the sensed data to the sink Each group of sensors has a cluster head or gateway. Cluster heads may be specialized nodes that are less energy-constrained. A cluster-head performs some aggregation function on data it receives and sends it to the sink as a representative sample of its cluster. Cluster formation is a design approach that minimizes energy consumption and latency. The factors affecting cluster formation, cluster-head selection and data aggregation and fusion among clusters are critical issues.

There are numerous drawbacks encountered when applying existing routing protocols to UGS networks. First, existing routing protocols can not handle time-critical applications because time synchronization was not considered in the design of existing routing protocols. Second, in order to maintain the routing table up to date, nodes have to periodically transmit beacon messages to their neighbors to determine their status. This generates undesirable overhead which, in turn, drains battery power of a node device. Third, existing protocol techniques are geared to handle very large numbers of sensor nodes (typically >10,000) that are scattered all over an area. Consequently, these techniques are not optimal for networks having, for example, as few as 20 nodes.

There are several features desired in a routing protocol for energy conservation in a UGS network. First, it is important that the routing protocol accommodate dynamic clustering architectures to prevent cluster heads from depleting their power, and hence extending the lifetime of the network. Second, efficient selection of a path is desirable to facilitate load balancing and, thus, be more tolerant to node failures. This can be accomplished with routing protocols that are capable of maintaining multiple low overhead routing paths. Third, the protocol should minimize over-the-air (OTA) transmissions by nodes. Fewer OTA transmission (i.e., beacon, topology updates, etc.) contribute to preserving battery life of a node device. Fourth, thresholds should be set for sensor nodes to transfer data to solve "hot spot" problems and saving energy by limiting unnecessary transmissions. Finally, thresholds should be provided for sensor nodes to relay data. That is, the capability to specify thresholds for energy and time delay when relaying data between nodes may better regulate transmissions and thereby extend the lifetime of a node device.

SUMMARY OF THE INVENTION

Briefly, a new "on-demand" approach is provided for a routing protocol that achieves balanced energy consumption among all participating nodes. A key to the achieving the desired energy efficiency is exploiting the received over-the-air (OTA) messages already used for certain purposes, in order to build routing or topology knowledge. These LNI messages include local node information (LNI) that a node receiving it can use to repair or bypass a lost upstream node in a real or virtual (temporary) manner depending upon the local node's battery level. Only if a repair process fails will a global re-organization be initiated. Nodes having lower power availability (battery level) may not transmit the LNI messages so that unaffiliated node(s) can select an upstream node having more power availability thereby extending network life.

According to the techniques described herein, a node may periodically transmit LNI messages after it becomes "Associated" with an upstream node so that it may alert other "Isolated" nodes about its existence. As a result, the "Isolated" nodes may learn that the node is a candidate upstream node for them. When a node decides to resign from being an upstream node or selects a better upstream node for local link repair, then the periodic LNI transmission is terminated. Some of the LNI parameters may be included in the broadcast messages, such as request-to-send (RTS) and clear-to-send (CTS) messages, that all nodes in the RF neighborhood hear and utilize when they perform a local repair. Because the re-organization process requires numerous OTA messages for the initial network formation, it is desirable to use the local repair first even if the solution may be sub-optimal until the next command of network formation is executed.

Nodes in the UGS network can go into a lower power consumption Sleep state in order to save energy. If a node has no data to transmit for a period of time defined by an activity timer value, it goes to the Sleep state. Rather than use a fixed activity timer value for all nodes in the network, the activity timer value for a node is based on the number of hops from the node to a main (or root) node so that the UGS network goes to sleep systematically or progressively in the event of inactivity. Similarly, rather than use a fixed refresh timer for controlling the transmission of network formation updates, the refresh timer for a node is based on the number of hops between the local node and the main node so that nodes farther downstream transmit network formation update messages less frequently than nodes closer to the main node.

Other objects and advantages will become more readily apparent when reference is made to the following description taken in conjunction with the accompanying drawings.

DETAILED DESCRIPTION

Figure 1:
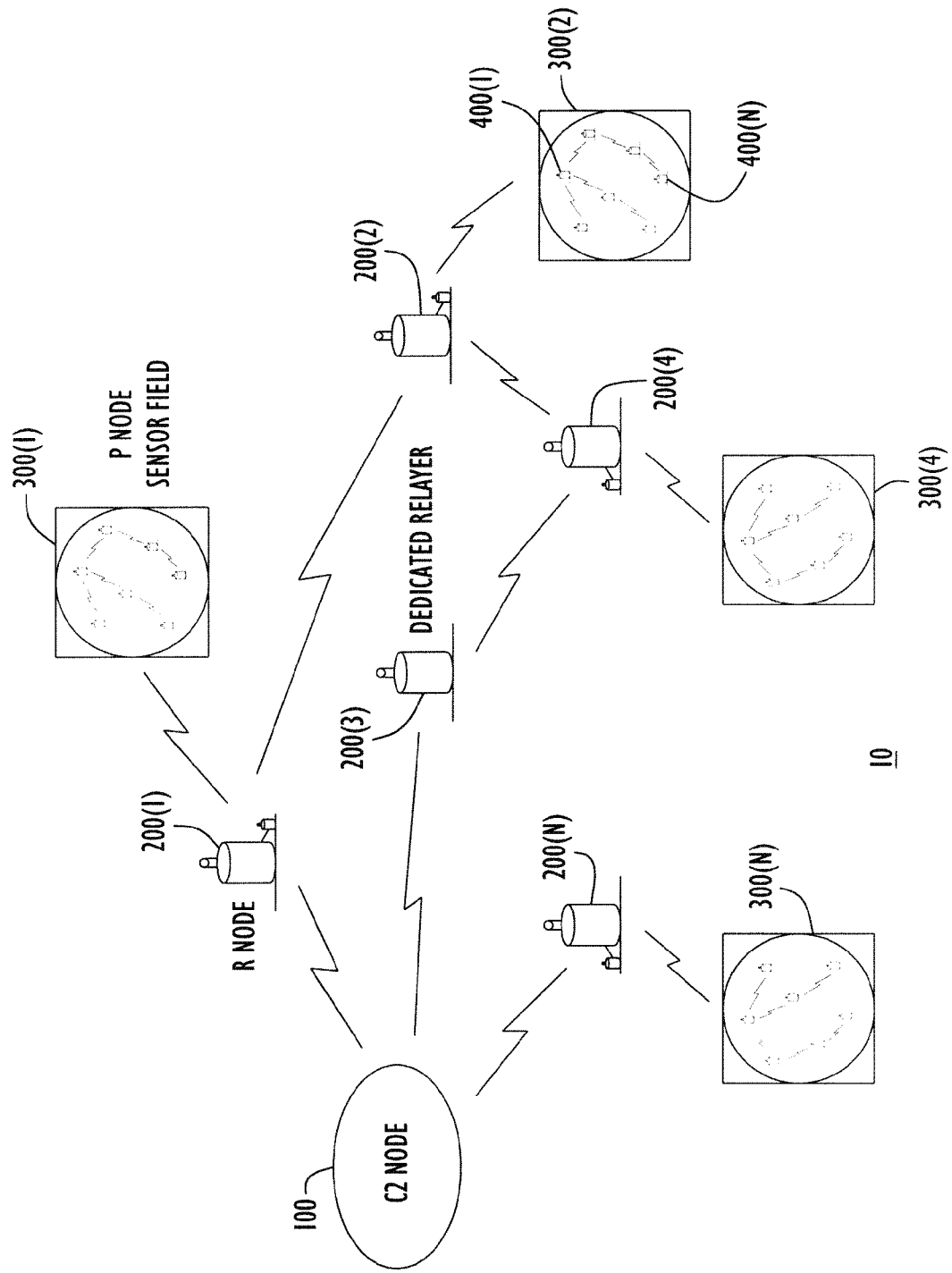
FIG. 1 is a network diagram of a sensor node radio network architecture.

FIG. 1 illustrates a wireless unmanned ground sensor (UGS) network 10 that is an example of the type of wireless sensor network in which the techniques described herein may be useful. The unique system requirements of the UGS network 10 affect virtually every aspect of its design, such as routing and link layer protocols. In the UGS network 10, the sensor derived data is forwarded to a Command & Control vehicle, called a C2 node, for processing. The C2 node is also referred to herein as the main node, hub node or "root" node in the sense that all other nodes feed data back to the C2 node. Thus, when the network 10 is viewed having a tree-like topology, the C2 node serves as a "root" node with respect to the other nodes. Sensors are deployed in the field in groups where sensors are located in proximity to each other.

Pointer sensors (referred to as P nodes) form a multi-hop network using short-range radios. Each sensor network also includes long-range-radio-equipped recognition sensors (referred to as R nodes) used to send sensor data back to the C2 node. For purposes of the following description, the C2 node is assigned reference numeral 100, the R nodes are assigned reference numerals 200(1) to 200(N), a P sensor field is assigned reference numerals 300(1) to 300(N) and P nodes are assigned reference numerals 400(1) to 400(N).

The P node sensors 400(i) perform simple sensing tasks such as target detection, location, and simple target classification using acoustic, seismic, magnetic, and simple motion detection. Data from a number of P nodes 400(i) are transmitted to a central collection R node 200(i). The R node 200(i) associated with each P sensor field 300(i) gathers data from all of its subtending sensors (P nodes) and processes and fuses that data to remove redundant information and false alarms. In addition to the information reported by the P nodes 400(i), the R node 200(i) may use locally attached sensors to further enhance the information that was received. Such a P node will be connected to an R node radio via an RS-232 link The R node radio provides the networking that forwards this data to the C2 node 100. If the distance between the C2 node 100 and the nearest R node 200(i) exceeds the maximum RF range, additional R nodes may be used as relays. The UGS terms of C2 and R2 are interchangeable with the terms sink and source, respectively, in sensor protocol nomenclature.

The R nodes 200(1) to 200(N) form a dynamic self-organizing networking headed by the C2 node 100. The C2 node provides the RF timing for the UGS network 10 and is also the head of the connectivity tree of the network. The following lists additional characteristics pertaining to UGS networks.

The C2 node 100 can initiate network organization of a tree-like network architecture. The C2 node 100 has unlimited battery power and can leave/join the UGS network at any time and any where. The C2 node 100 may announce shut down of the UGS network. The C2 node 100 needs to know the path or network route to every R node 200(1) to 200(N). However, an R node 200(i) needs to know only about the C2 node 100.

The majority of traffic consists of unicast messages between C2 and R nodes. Most of that traffic is in the direction from R nodes to the C2 node. Two wake-up sequences are available (C2-initiated and sensor-initiated). There are messages called Late Net Entry (LNE) message that can carry network organization parameters. Sensor data traffic can wake up nodes towards the path to the C2 node 100; but need not wake up the entire network. The network protocols should be efficient so that power for each of the nodes in the network can last as long as possible.

Figure 2:
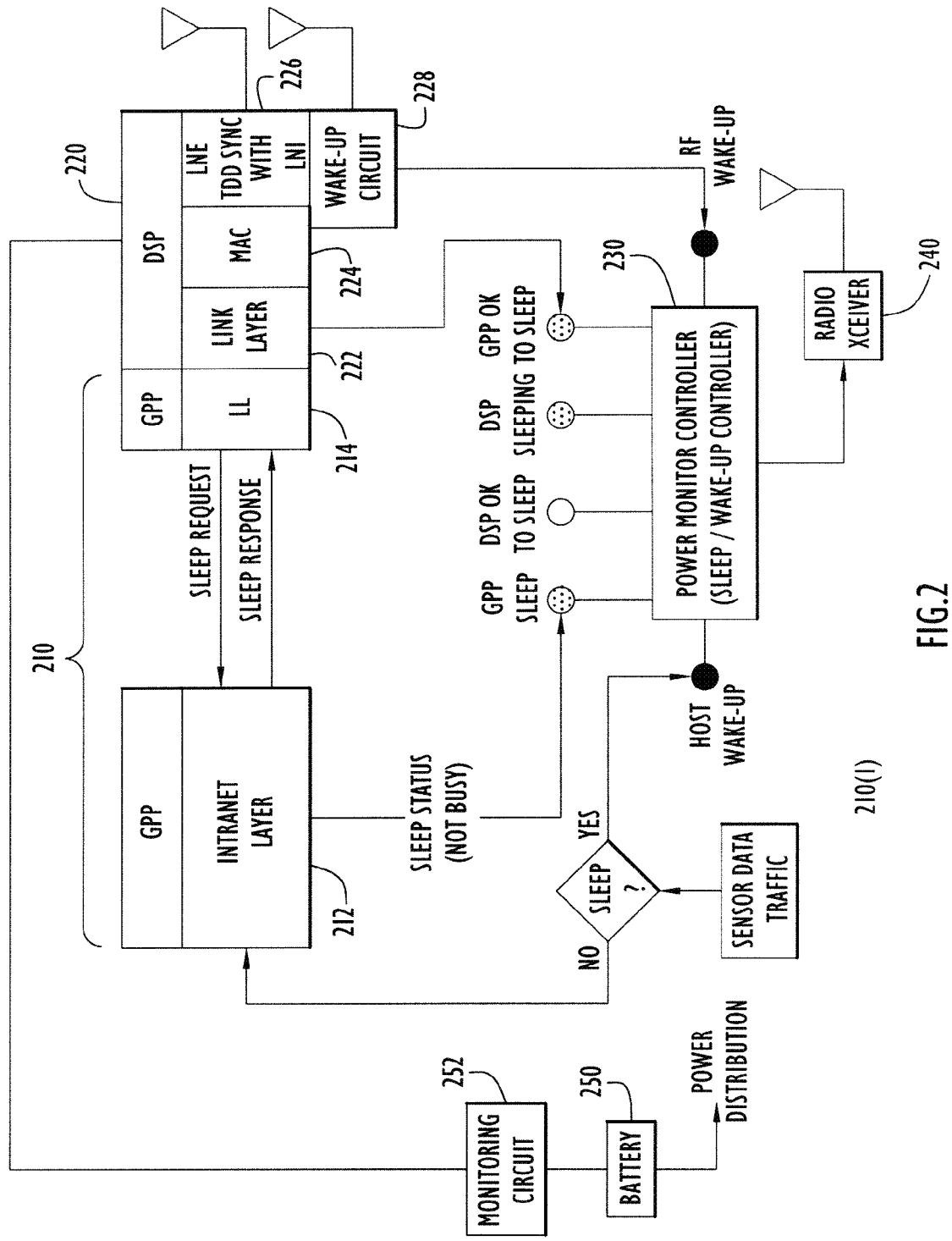
FIG. 2 is a system block diagram of a sensor node radio device.

With reference to FIG. 2, a block diagram of the significant components and functions of an R node 200(i) will be described. An R node 200(i) comprises a general purpose processor (GPP) 210 and a digital signal processor (DSP) 220. The GPP 210 manages intranet layer functions 212 and some aspects of link layer (LL) functions 214. The DSP 220 manages link layer functions 222, MAC functions 224, late network entry (LNE) synchronization functions 226 and a wake-up circuit 228 that generates an RF wake-up signal. There is also a power monitor controller 230, also called a sleep/wake-up controller that monitors power consumption and availability and is coupled to a radio transceiver 240. The wake-up circuit 228 can wake-up the DSP 220 from a sleep mode.

In addition, an R node 200(i) includes a battery 250 that supplies power to the various components of the R node and a monitoring circuit 252 coupled to the battery 250. The monitoring circuit 252 monitors the battery level to determine the amount of power that is available to the R node. The monitoring circuit 252 generates an output signal that represents the battery level of the battery 250 and supplies this signal to the GPP 210 and the DSP 220. The DSP 220 can use information about the current power availability of the node to determine how the node may execute a repair process in the event the node loses communication with an upstream node, as described hereinafter.

When the R nodes 200(i) are initially deployed, they are configured by a relayer and enter the Sleep state after their activity timers expire. They take no further action until the C2 node 100 has issued a network formation command. This feature prevents deployed sensors from becoming prematurely active and consequently depleting their batteries. In order to organize the UGS network, the C2 node 100 issues a wake-up command, followed by an LNE message. The LNE message is used to establish time synchronization throughout the UGS network and to convey topology information about the network. For this reason, the LNE message is often referred to as a synchronization message. The C2 node 100 then issues an organization command, causing the R nodes 200(1) to 200(N) to exchange topology information with each other. If there is no data traffic to be sent and a node's activity timer is expired, the node enters the Sleep state to conserve battery power and start to monitor the wake-up channel.

The design of the UGS network takes advantage of the fact that P sensor nodes 300(1) to 300(N) do not move and, therefore, do not require frequent routing updates. In the UGS network domain, the C2 node 100 is always either the source or the destination of all traffic and any node's configuration can be changed by a host command. The C2 node 100 can leave, join, and be configured any time during deployment.

The bulk of the traffic is from R nodes 200(1) to 200(N) to the C2 node 100. This skewed traffic route can significantly strain the energy resources of the R nodes near the C2 node 100, making that neighborhood more susceptible to energy depletion and failure. The C2 node 100 has unlimited energy while the relayer R nodes (e.g., R node 200(3)), which do not have sensors, are dedicated to forwarding the sensor data. R nodes 200(1) to 200(N) operate on a limited battery lifetime. Hence, energy efficient protocols at various levels (i.e. physical layer, link layer, network layer, etc.) are important for the UGS network.

The network protocol described herein involves including local node information (LNI) in LNE messages as well as controlled transmission of messages containing LNI. In addition, techniques are provided for a "Resign" process for a node base on its battery level.

The transmission of over-the-air (OTA) messages is very expensive in terms of battery consumption for a node. Some minimum transmission of OTA messages is required in sequence to (1) time-synchronize nodes; (2) find an upstream node, (3) join the tree containing that upstream node and (4) maintain the tree.

The UGS network 10 uses two distinct channels: (1) a wake-up channel, and (2) a normal communication channel. To receive signals on the wake-up channel, each R node has a separate, ultra-low power receiver (receiver 240 in FIG. 2) that listens for wake-up signals. When a node enters the Sleep state, the antenna is mechanically switched from the normal receiver to the wake-up receiver. The LNI message is transmitted on a frequency channel (called a synchronization channel) with CDMA spreading codes and transmission security (TRANSEC) based on an LNI period. Therefore, if the internal clocks of two nodes match each other within the coarse LNI period granularity, then either node will be able to hear the other's LNI message. The transmitted LNI message contains information that will allow the receiving node to synchronize its internal clock with that of the transmitting node to a finer level of granularity. All nodes in a certain state monitor the synchronization channel and will eventually receive synchronization message containing the LNI from one or more other nodes. Once time-synchronized, normal data exchange can take place between the two nodes. LNI operations are designed to permit rapid network formation, while ensuring minimum impact on network components that have already been formed. A node that has not yet discovered any RF neighbor nodes is referred to as an "Isolated" node, whereas a node that has discovered its neighbors is referred to as an "Associated" node.

Overview of Network Formation Algorithm

Figure 3:
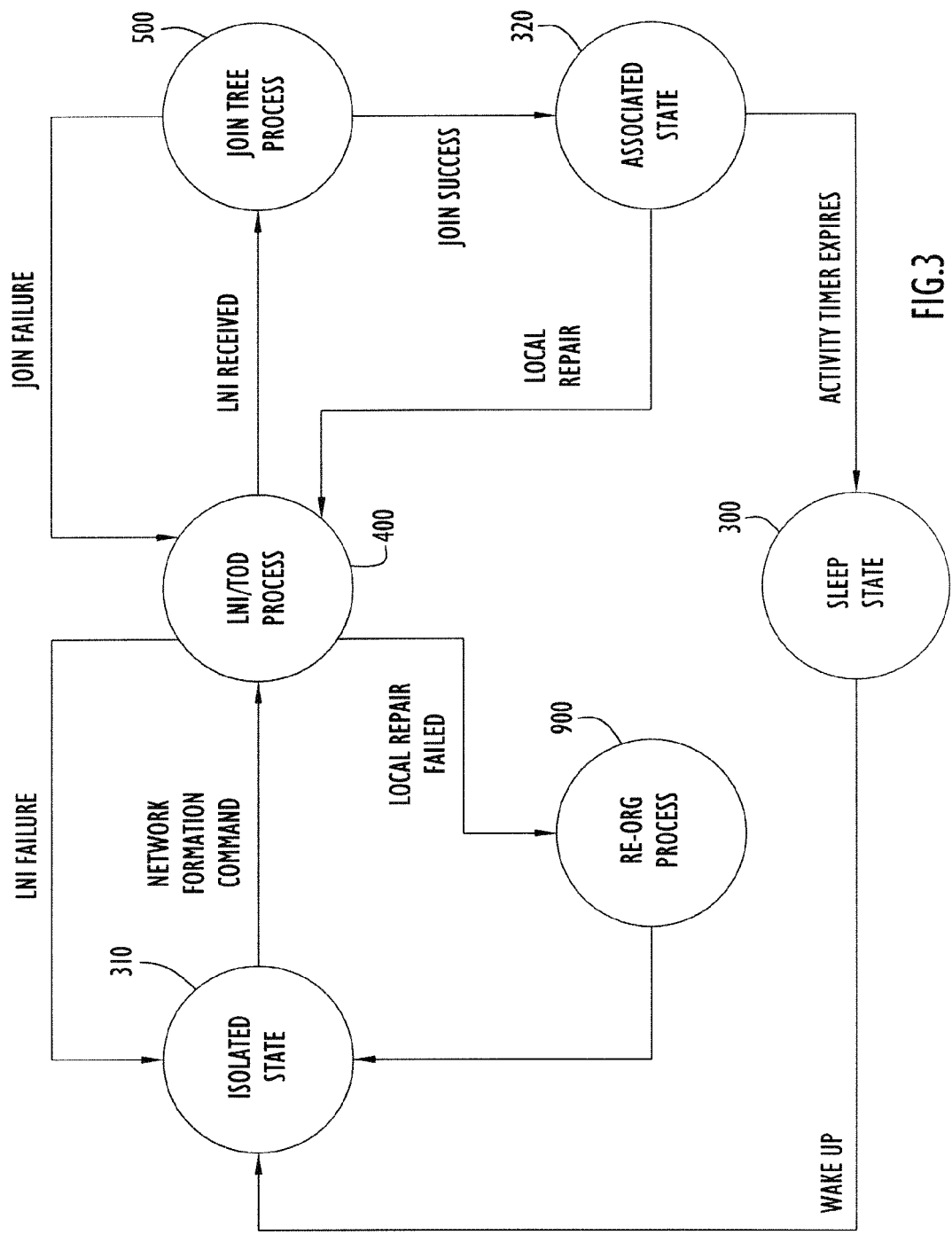
FIG. 3 is a flow chart of a network formation algorithm for the network shown in FIG. 1.

A timing sequence for the wake-up, LNI and routing operations is depicted by the network formation event sequences shown in FIG. 3. The R nodes can take on one of three states: Sleep 300, Isolated 310 and Associated 320. The C2 node is considered in the Associated state initially. When the C2 node wants to collect the data from the sensor fields it initiates the formation of the sensor network by transmitting a C2 node wake-up signal to wake up the nodes in Sleep state 300, followed by an LNI message. In response to the node receiving a wake-up signal, the node enters the Isolated state 310. A node in the Isolated state 310 rebroadcasts the received C2 node wake-up pattern and sets its receiver to listen on the synchronization channel for LNI messages (synchronization messages containing LNI) in order to synchronize its local clock with the clock of the C2 node according to the LNI/TOD process 400. When an Isolated node receives an LNI message, it synchronizes its clock with that node (initially C2's clock) and tries to join to the existing tree according to the join tree process 500. In the join tree process 500, the Isolated node transmits a join request (JOIN_REQUEST) packet to an upstream node (already Associated). The upstream node sends an acknowledgement (JOIN_ACK) packet back to the requesting node. Upon receiving the JOIN_ACK packet from the upstream node, the downstream node enters the Associated state 320 and can behave like an upstream node with respect to other unassociated nodes. That is, the Associated node transmits LNI messages periodically to be received by other Isolated nodes to enable those Isolated nodes to join to the existing UGS network, and consequently become Associated.

If after receiving LNI message(s) an Isolated node fails to join an existing tree in the network, the Isolated node goes back to the LNI/TOD process 400 to try to join again until the join timer is expired. If the Isolated node still fails to join the existing tree, then it reverts to the Isolated state and waits for the next network formation command. When an Associated node needs to repair a link with its upstream or downstream nodes, it uses the LNI/TOD process 400 first to repair the local link If the local repair fails, then a global "Re-Org" process 900 starts and the node goes to the Isolated state. If an Associated node is idle after its activity timer expires, then it goes to the Sleep state 300.

The conventional LNE message contains only the local clock information to time synchronize with the neighbor's clock. A new LNI message is provided to accommodate additional information:
Sender's Local Clock
Source Node ID
C2 Address
Number of Hops To C2 Node (or Cost To C2 Node)
Battery Life Index
Number of Downstream Nodes
Maximum Number of Hops To C2

The last two items (Number of Downstream Nodes and Maximum Number of Hops To C2) are set to 0 and the default value (MAX_NUM_HOPS_TO_C2), respectively, until the network is formed. Normally, the probability of participating in the data transmission process is higher for the node having more downstream nodes than the node having fewer downstream nodes. Consequently, the node having more downstream nodes could deplete its battery sooner. To combat this unbalanced battery power consumption, the last two items of node information, Number of Downstream Nodes and Maximum Number of Hops To C2, are added so that the downstream node can select the upstream node energy-efficiently in the link layer. A downstream node in the Isolated state will receive LNI messages from one or several upstream nodes that are in the Associated state. To the downstream node, these upstream nodes are referred to as candidate upstream nodes. The downstream node can select among the candidate upstream nodes the upstream node that has the fewest downstream nodes. This will ensure that a balance of power consumption among the nodes by distributing the data routing or (forwarding) responsibility of upstream nodes. Thus, the Number of Downstream Nodes of a node is a measure or indication of the level or degree of data routing (forwarding) responsibility of that node.

The periodic LNI message transmission rates at each node may be modified by adding the number of downstream nodes term:

$$LneXmtTime = A1*LneHopInterval + A2*BatteryLifeInterval + A3*LneCountInterval + A4*NumMbrInterval + random(LneXmtInterval) \quad (1)$$

where A1=number of hops to C2/maximum number of hops to C2

A2=remaining battery level/maximum battery level

A3=LNE message count starting from 0 and incrementing by one.

A4=Number of Downstream Nodes.

Thus, the frequency at which a node transmits LNI messages is based on, among other factors, the number of downstream nodes associated with that node such that the frequency of LNI message transmission is lower (the Period is longer) for nodes having more downstream nodes. Thus, a node with more data routing responsibility will transmit the LNI messages less frequently (longer Period) than nodes with less data routing responsibility.

While conventional network protocol techniques attempt to form the network topology database at the network layer receiving all the possible neighbors, the LNI message technique contains all the necessary information to form the network database efficiently at the link layer.

In some sensor networks, a carrier sense multiple access with collision avoidance (CSMA/CA) scheme is used to combat the so called hidden terminal problem. If the conventional request-to-send (RTS) and clear-to-send (CTS) waveforms do not have enough room for the LNI message information, then only the most critical information (Cost To C2 Node and/or Battery Life Index) is added. When a node hears a neighbor's RTS and/or CTS transmission, i.e., "promiscuous listening", it stores LNI contained in those RTS and/or CTS packets for later use as a local repair candidate upstream node. The broadcast RTS/CTS scheme may be also utilized to check the link status of the current upstream node. It is desirable to minimize the number of OTA message to avoid the unnecessary battery power depletion. Therefore, in some applications, any broadcast message (i.e., LNE, RTS, and CTS) may include the additional LNI to monitor neighboring nodes when in the Associated state.

Also, data packets transmitted from a downstream node to an upstream node may include the additional LNI so that the upstream node knows the downstream node's status. If the downstream node has low battery reserve, then information is transferred to the C2 node, which could initiate placement of a relay node or further reconfiguration of the UGS network.

Join Tree Process

When a sensor node does not have data to transmit, then it may stay in the Sleep state. A node in Sleep state may flush its routing table until it has data to send. When the C2 node wakes up by itself or wakes up sensor node(s), it starts to re-synchronize and to "re-route" the UGS network. This "on-demand" approach for UGS network routing employs a "greedy" algorithm that always takes the best immediate, or local, solution while meeting the UGS application requirements. The greedy algorithm is usually faster, since it does not consider the details of possible routing paths in the UGS networks. It may find less-than-optimal solutions under certain conditions. Many minimum cost routing algorithms in the sensor networks can not be applied for the UGS network because these algorithms assume that neighbor discovery messages are transmitted periodically to monitor the link status to its upstream and/or downstream nodes. Also, the sleep/wake-up process and the C2 node leave/join process in the UGS network prohibits the use of conventional on-demand routing algorithms or minimum cost routing algorithms.

The C2 node initiates formation of the UGS network using a sequence such as: (1) time-synchronize the nodes, (2) select the upstream node, and (3) execute a join tree process. Each UGS node maintains a network formation database. It is initially cleared. The network formation database contains (1) upstream node address, (2) C2 node address, (3) cost-to-C2, and (4) number of sub-tree members (number of downstream nodes). The value of cost-to-C2 can be based on either the number of hops to C2 or the minimum energy to C2.

Figure 4:
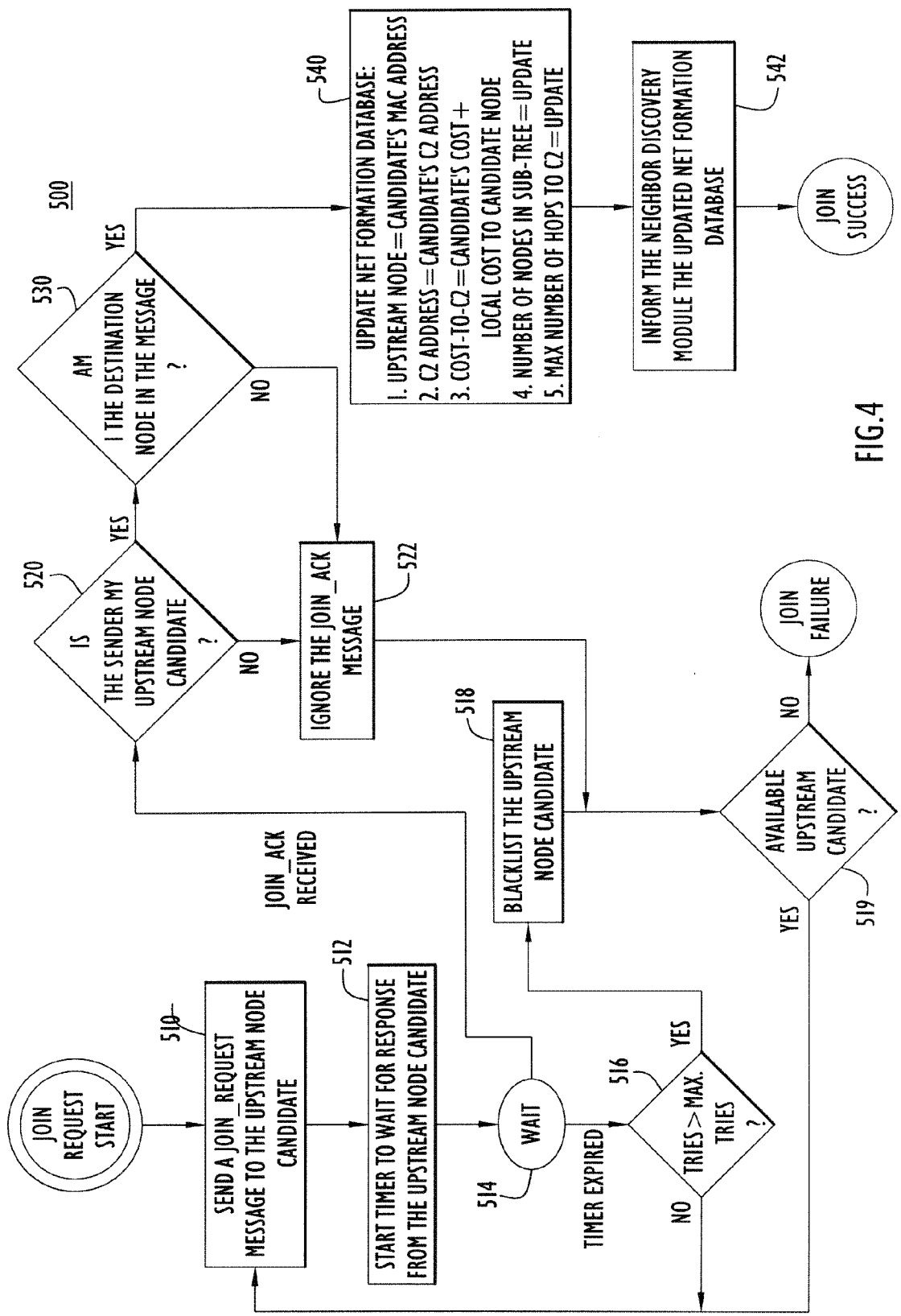
FIG. 4 is a flow chart of a join tree process for the network.

FIG. 4 shows a flow diagram of the join tree process 500 to illustrate how a network is formed using the LNI techniques. Initially the upstream node, the C2 node address and number of downstream nodes are set to 0 and the cost-to-C2 to infinity. The C2 node sets the upstream node address and C2 address to its local address and the cost-to-C 2 to 0. Then, the C2 node informs the link layer, sends the "FORM_NETWORK" command and declares that it is "Associated"— namely there exists a C2 node in the UGS network. If a C2 node is not present in the network, there is no UGS network. A node in Isolated state will receive an LNI message from each of its candidate upstream nodes, and will select the candidate upstream node that has the least data routing responsibility, i.e., the candidate upstream node that has the least number of downstream nodes. This mechanism attempts to discourage nodes with low remaining battery power from participating in the routing process, thus prolonging their "lifetime" in the network. In fact, it is more likely that the LNI message sent from a node with a low battery will not be received by the downstream nodes since it receives the LNI from the better upstream node and switches the receiver to the normal communication channel, terminating further LNI channel monitoring. This candidate upstream node may be referred to as a selected upstream node.

When an Isolated node selects a candidate upstream node, it tries to join the existing tree at that selected upstream node by transmitting a JOIN_REQUEST message to the selected upstream node in step 510. The Isolated node then starts a timer in step 512 and waits for a response from the selected upstream node in step 514. If in step 516 it is determined that the timer expires before a response from the selected upstream node is received by the Isolated node, then the Isolated node may repeat its attempt to join the tree at the selected upstream node, and after a maximum number of attempts that are not acknowledged by the selected upstream node, that selected upstream node is "blacklisted" (deleted as an available upstream node) in step 518, and in step 519 a determination is made as to whether other candidate upstream nodes are available. If there are no other candidate upstream nodes available, then a join failure declaration is made and the node stays in the Isolated state.

On the other hand, if the Isolated node receives a JOIN_ACK message from the selected upstream node, the Isolated node determines whether the JOIN_ACK message is from the selected upstream node and not some other node. If the JOIN_ACK message is from another node, the Isolated node ignores the message in step 522. If the JOIN_ACK message is from the selected upstream node, then in step 530, the Isolated node examines the message to be sure that it is the intended destination, and if so the process continues at step 540.

In step 540, the node updates its network formation database. In particular, it stores or updates in the database: (1) the address for the selected upstream node, (2) the address of the C2 node (obtained from the LNI message received from the selected upstream node), (3) the cost-to-C2 derived from the cost-to-C2 obtained from the selected upstream node's LNI message and the local node's cost to the selected upstream node, (4) number of nodes in the selected upstream node's sub-tree, and (5) maximum number of hops to the C2 node for the UGS network. This essentially forms the information that is a significant part of the LNI message that the node, now in the Associated state, will transmit in an LNI message to other Isolated nodes. In step 542, the node will inform its neighbor discovery module with the updated network formation data. As indicated above, when the join tree process is successful upon receiving a JOIN_ACK message from a selected upstream node, the Isolated node becomes Associated and can be an upstream node candidate for other Isolated nodes to join.

Figure 5:
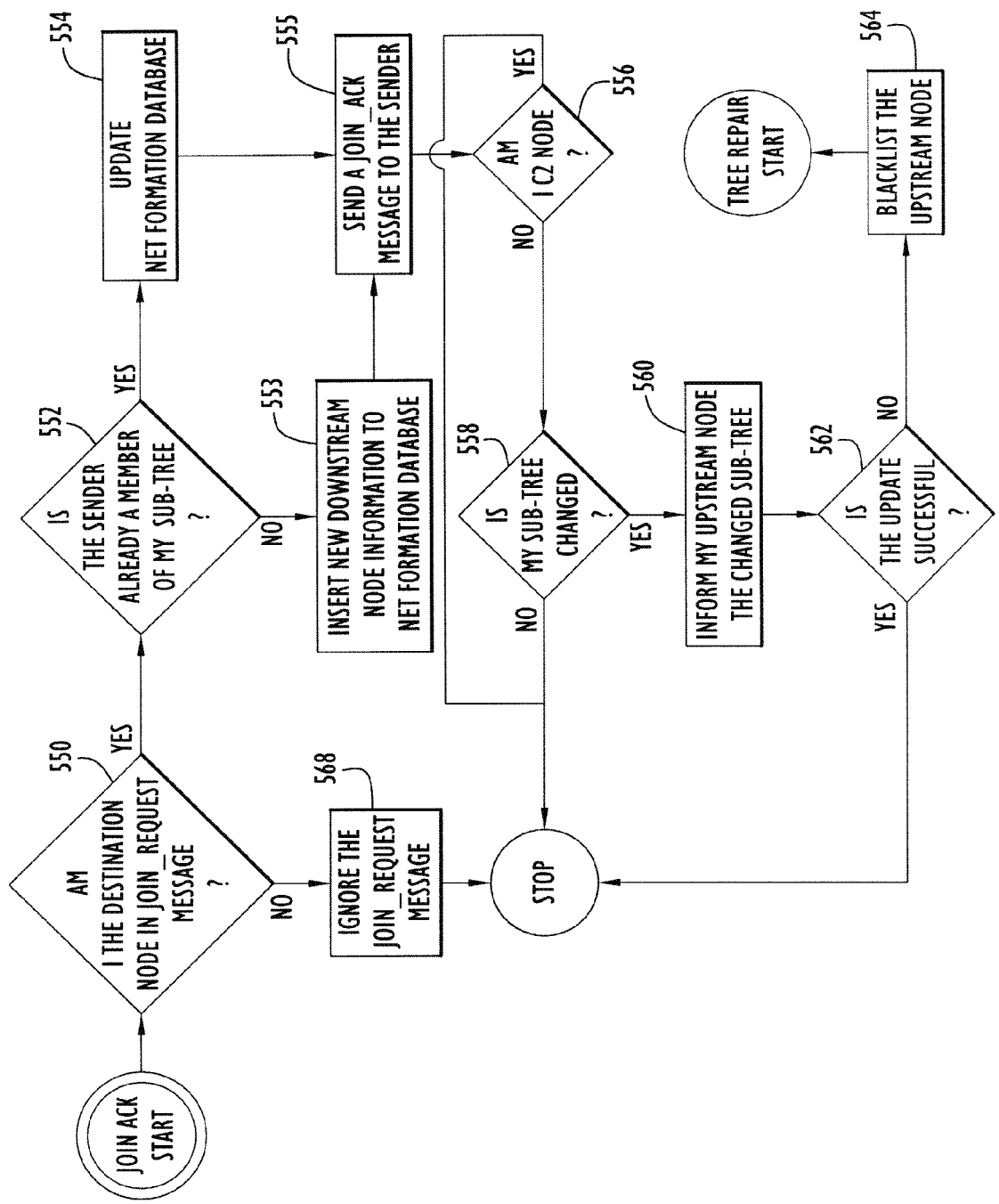
FIG. 5 is a flow chart of a join acknowledgement process for the network.

FIG. 5 illustrates the join acknowledgement process executed by an upstream node in response to receiving a JOIN_REQUEST message from an Isolated downstream node. When an upstream node receives a JOIN_REQUEST message from a downstream node, in step 550 it determines whether it is the correct destination of the JOIN_REQUEST message. If the upstream node is the correct destination, then in step 552 the upstream nodes determines whether the downstream node that sent the JOIN_REQUEST message is already a member of its sub-tree. If the downstream node is not already a member of its sub-tree, then in step 553, the upstream node inserts information into its network formation database to indicate the new downstream node is part of its sub-tree. If the downstream node is already a member of the upstream node's sub-tree, then in step 554, the upstream node updates the network formation database accordingly. In step 555, the upstream node transmits a JOIN_ACK message to the downstream node that sent the JOIN_REQUEST message.

After transmitting the JOIN_ACK message, the upstream node determines whether it is the C2 node, and if so the process terminates. If not, then in step 558, the upstream node determines whether its sub-tree is changed as a result of transmitting the JOIN_ACK message to the downstream node. If there is no change in its sub-tree, the process terminates, but if there is a change, then in step 560, the upstream node transmits a message to its upstream node, wherein the message contains updated topology information with respect to the change in its sub-tree, and so on. Eventually, the updated topology information reaches the C2 node. Thus, the C2 node knows the complete tree topology for the UGS network. This routing process simplifies maintenance of the routing table. Again, there is no continuous neighbor discovery process running in order for the network to maintain the routing table. Once the network is formed, the C2 node and sensor nodes include information indicating number of downstream nodes in their LNI messages. An Isolated node uses the LNI it receives from candidate upstream nodes to select the best upstream node to join based on the measure of data routing responsibility of the respective candidate upstream nodes. If the JOIN_ACK message is not received within the given period, it stays in the Isolated state.

In step 562, the upstream node determines whether the update in step 560 was successful, i.e., that its upstream node received and acknowledged receipt of the sub-tree change information. If the upstream node does not receive an acknowledgement from its upstream node, then in step 564, the upstream node that did not acknowledge the update information is considered "blacklisted", and a tree repair process is executed. The tree repair process is described hereinafter in connection with FIG. 6-9.

When a local node fails to transmit a message to an upstream node, then either the link and/or the upstream node have failed such that communication with that node is lost or compromised. When the upstream link is broken for "external" reasons, then the sub-tree rooted at that local node is disconnected from the rest of the tree. To repair the damaged tree, the local node initiates a link to the rest of the tree via an alternate path, that is, at another node in the network. If the upstream node refuses to forward the data of the downstream node for "internal" reasons (i.e., lack of its battery reserve), the downstream node determines how to repair the broken upstream path. Thus, both external and internal reasons are considered when repairing the routing. External reasons are not controlled by the local node. Internal reasons may be determined by the local node's battery level.

Figure 6:
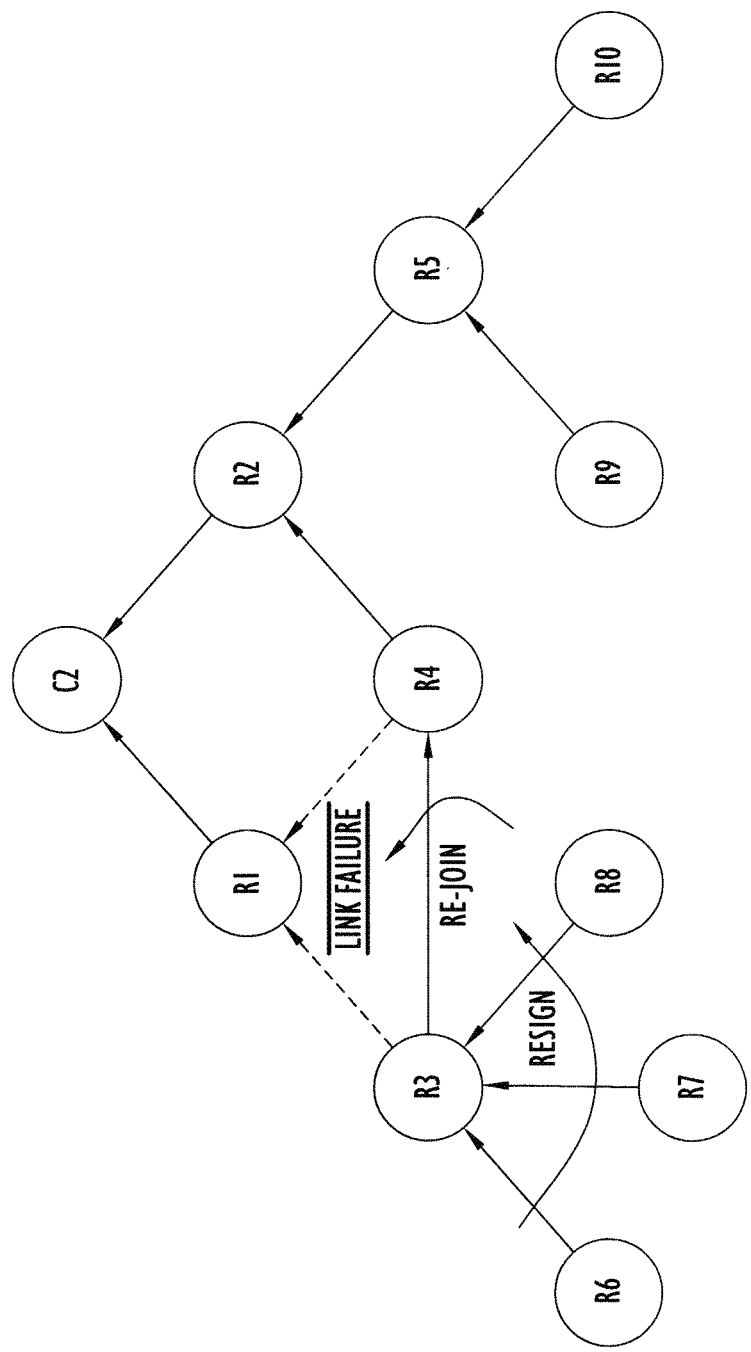
FIG. 6 is a node diagram depicting an example of a repair situation.

For example, as shown in FIG. 6, if R3 fails to reach R1 for internal or external reasons, R3 tries to wake-up and communicate with the failed upstream node (R1) first. If failed, it tries to find an alternate route. A local repair approach is described herein that is based on the local node's battery reserve. Until the local repair process is finished, the periodic LNI transmission is stopped to avoid being the upstream node from the Isolated node or its sub-tree nodes again. However, data from its sub-tree nodes are forwarded to the current upstream node until the new route is established.

Classification of Internal Reasons

A local node's power availability (e.g., battery level) is compared with several thresholds when the local node decides how to repair the broken path: (1) a (first) soft threshold, (2) a (second) hard threshold, and (3) a (third) dead threshold. The first threshold is greater than the second threshold, and the second threshold is greater than the third threshold. If the local node's battery level is greater than the soft threshold and other upstream node candidate(s) is/are available, then the re-join process (real repair) with R4 is performed to repair the failed upstream node locally. The selection of the alternate upstream node is the goal of the best local repair method. If all alternate upstream nodes are tried without success, then R3 sends the "Re-Org" message to C2 that initiates a global repair.

If the local node's (R3) battery level is less than the soft threshold or has other reasons not to be the upstream node, then it broadcasts the resign message to neighbor nodes to inform them that it is resigning as an upstream node and to join with another upstream node. Also, R3 waits for the resign timer to expire to give enough time for the downstream node(s) to join to other Associated node(s). When a leaf node receives the resign message, it becomes Isolated immediately and goes to the LNI/TOD process (FIG. 3) to try to join another existing part of the network.

Two methods are described to repair the disconnected sub-tree: (1) real repair and (2) virtual repair. In the real repair method the local node sends the OTA join messages and re-routes the path. The virtual repair approach involves sending the data to the existing upstream node without executing the formal join tree process.

Figure 7:
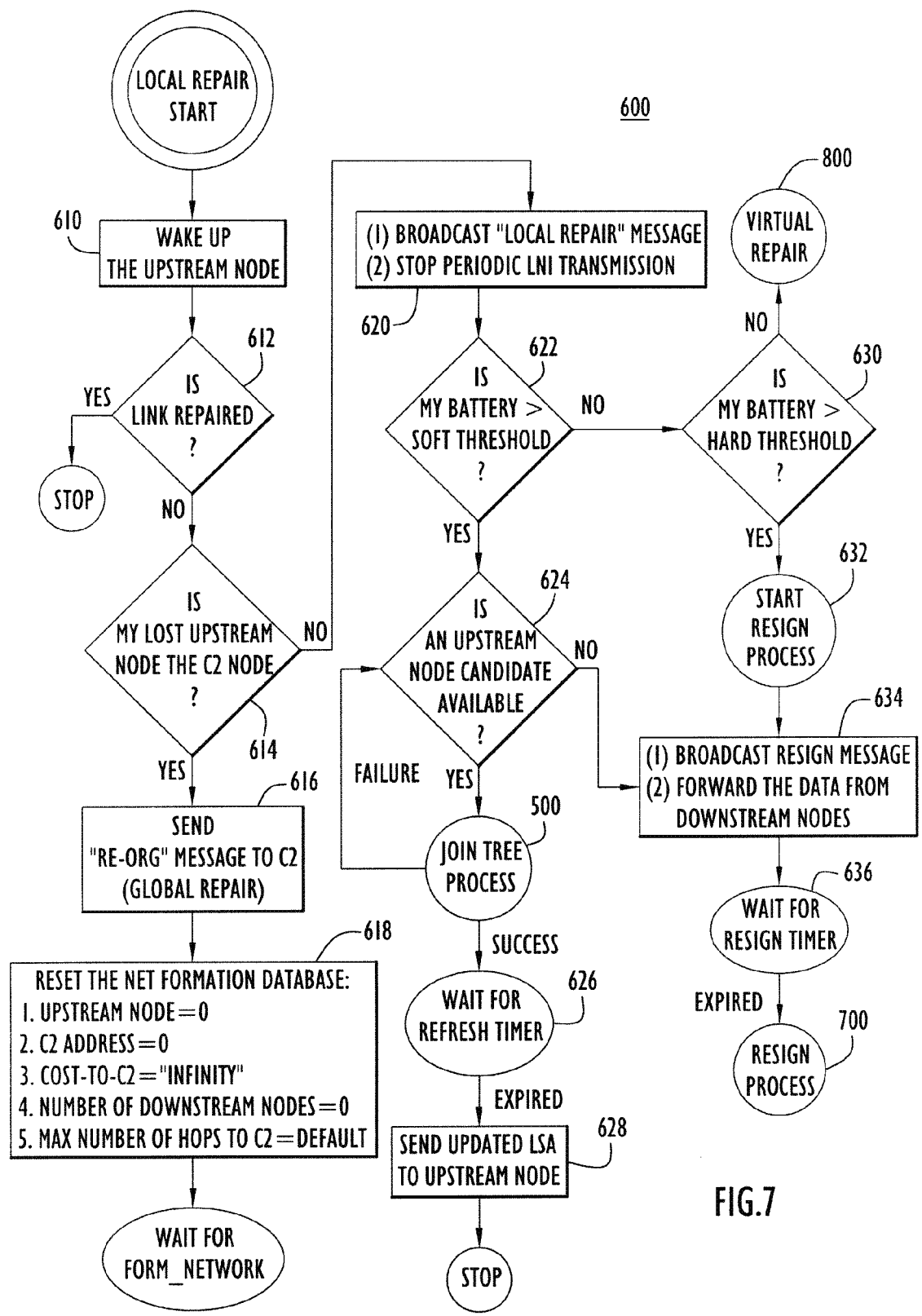
FIG. 7 is a flow chart of a route maintenance process invoked for a repair situation.

Turning to FIG. 7, the repair process 600 will be described. When a node determines the need for link repair, it wakes up its upstream node in step 610. Then in step 612, it determines whether the link with the upstream node is repaired. For example, the upstream node may go into Sleep mode after its activity timer expires. Then, the downstream node wakes it up to forward data from the downstream node. If in step 614, a node determines that the lost upstream node is the C2 node, then in step 616 the node sends a "Re-Org" message to the C2 node and global repair is initiated, whereby the C2 node initiates the "FORM_NETWORK" command. The network formation database is reset to the default or initial parameters in step 618. The whole tree may be rebuilt and (potentially all) the routes may be reconfigured. While this may help to achieve theoretically optimal performance, the overhead (including the Re-Org and reconfiguration of routes) may be too expensive in terms of battery consumption for the nodes. It is desirable to avoid a global "Re-Org" if possible.

The local node may hear messages, such as LNI messages and broadcast messages (RTS/CTS/ACK) from its neighboring nodes, and using these messages determine and select an alternate route back to the C2 node. This will reduce the unnecessary OTA message transmission to repair the path. In the event that the lost upstream node is not the C2 node, then the process continues to step 620 from step 614. In step 620, the local node broadcasts a "Local Repair" message (first message) to alert its downstream node(s) that a local repair process is under way, and the local node stops the periodic LNI transmission. Depending on the local node's battery level, it decides how to find the alternate path. In step 622, if the local node's battery level is greater than (or equal to) the soft (first) threshold, the join tree process is performed until all the available upstream nodes are tried. In step 624, the local determines whether there is a candidate upstream node available (by listening for LNI messages). If there is a candidate upstream node(s) available, the local node executes the join tree process 500 shown in FIGS. 4 and 5. If it successfully joins a tree, then in step 626 the local node waits for a time period equal to a refresh timer value, and after expiration of that time period, in step 628 it transmits an updated LSA message to the upstream node. The refresh timer value may be adaptively or dynamically changed depending on the number of node hops between the local node and the C2 node. The concept of an adaptive refresh timer is described in more detail hereinafter.

If the local node's battery is less than the soft (first) threshold in step 622, then it is compared to the hard (second) threshold in step 630. If the local node's battery level is greater than (or equal to) the hard threshold, then it starts the resign process in step 632, and then immediately broadcasts a resign (second) message in step 634, and in the meantime continues to forward the data received from its downstream nodes. After a period of time corresponding to a resign timer value in step 636, the downstream nodes perform the resign process 700 and other neighbor nodes prepare to be potential upstream nodes. The resign process 700 is described hereinafter in connection with FIG. 8. The refresh timer is longer than the resign timer value because the downstream nodes need sufficient time to join with other upstream nodes. Until the resign timer expires, the downstream nodes forward messages to the current upstream node and stop transmitting periodic LNI messages to avoid being the upstream node. In the event the local node fails the join tree process in step 624, then the process proceeds to step 634 in which the local node broadcasts a resign message (second message) to inform its downstream nodes that it is resigning as an upstream node and therefore to join at another nodes.

If in step 630 it is determined that the local node's battery level is less than the hard (second) threshold, then it performs the virtual repair process 800 as a temporary routing solution. The virtual repair process 800 is described hereinafter in conjunction with FIG. 9.

Figure 8:
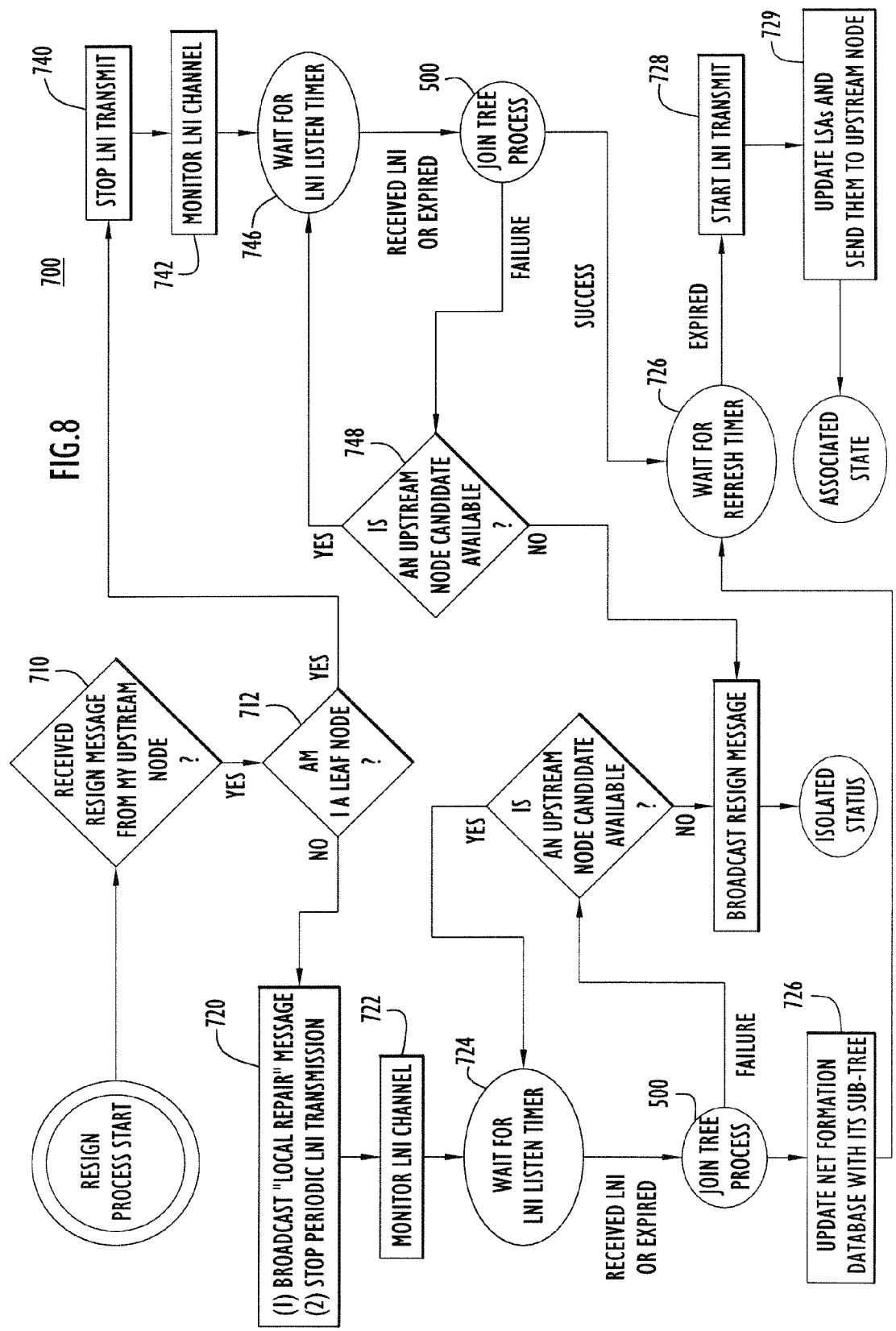
FIG. 8 is a flow chart of a process invoked when a downstream node receives a resign message from its upstream node.

Turning to FIG. 8, the resign process 700 will be described. When a node receives a resign message from its upstream node in step 710, it determines whether it is a leaf node (the last or end node of a branch) in step 712. If it is not a leaf node, then it has downstream nodes associated with it and in step 720 it broadcasts the "Local Repair" (first) message and stops periodic transmission of LNI messages to alert its downstream nodes of a repair process, but in this case it tries to join at another upstream node. Next, in step 722, the local node monitors the LNI channel for a time period corresponding to an LNI listen timer value in step 724. Upon receiving an LNI message from an upstream node or expiration of the LNI listen timer, the local node executes the join tree process 500 (FIGS. 4 and 5). If the local node successfully joins a tree, then in step 726 it updates its net formation database and after the refresh timer expires in step 728, it starts transmitting LNI messages to its downstream nodes to inform them of routing changes made. Also, in step 729, the local node updates and transmits the LSA information to its upstream node, and the local node is now in the Associated state.

If the join tree process fails, then in step 730, the local node determines whether there is another candidate upstream node. If there is another candidate upstream node, then the process continues from step 724 as described above. Otherwise, the process continues to step 732 where the local node broadcasts a resign message to its downstream nodes and goes into the Isolated state.

If in step 712, the local node determines that it is a leaf node, then the process goes to step 740 where it stops transmitting LNI messages, and immediately tries to re-join with an upstream node after an LNI message is received or the LNI listen timer expires in steps 742, 744 and 746. If the local node has a sub-tree, it maintains the sub-tree members and attempts to re-join at another upstream node. If the join tree process 500 is successful, then steps 726, 728 and 729 are performed as described above. Otherwise, the local node determines whether there is another candidate upstream node in step 748, and if not, then the local node goes into the Isolated state.

Virtual Repair

Figure 9:
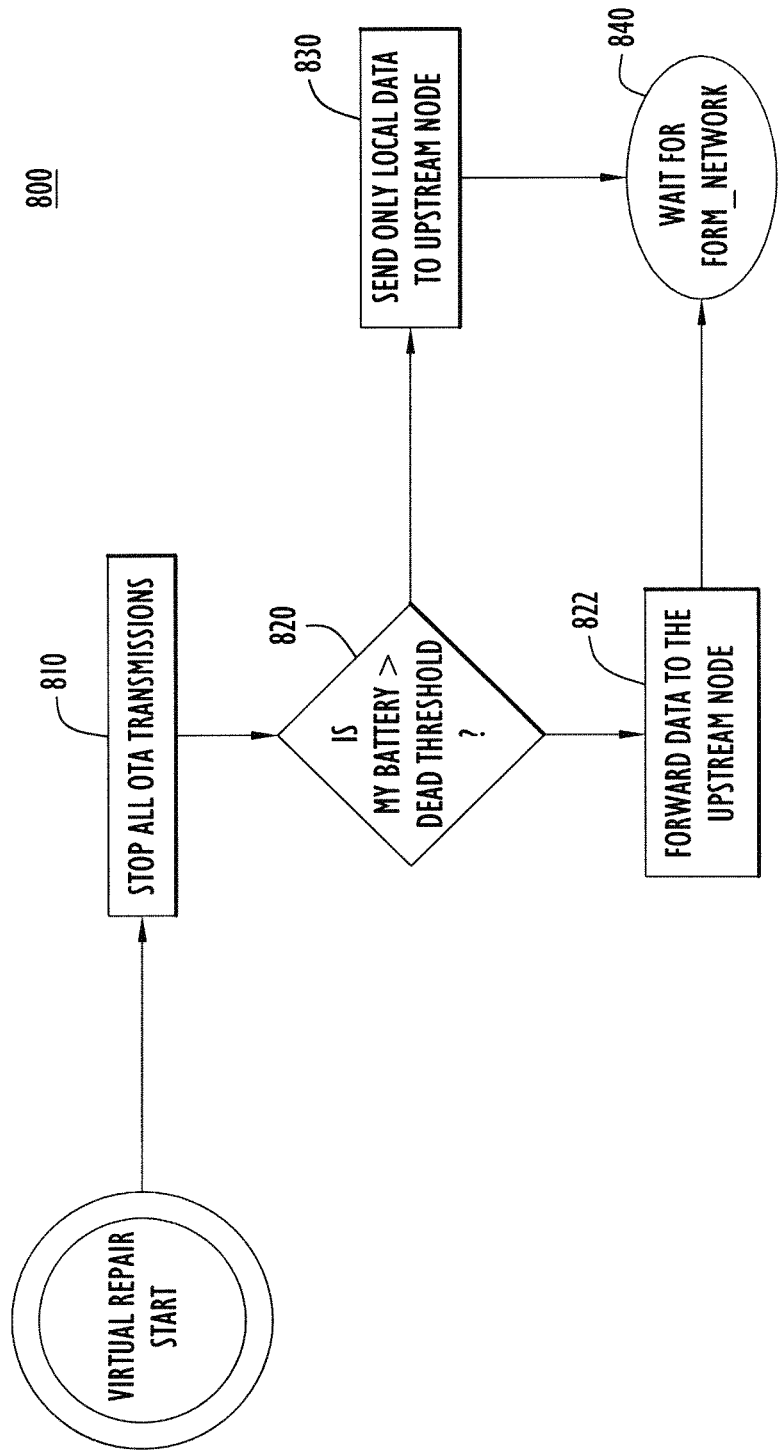
FIG. 9 is a flow chart of a virtual repair process invoked when a node is under extremely low battery level conditions.

With reference now to FIG. 9, a second repair method, called a virtual repair method, is described. If the current battery level of the local node is less than the hard (second) threshold (step 630 in FIG. 7), then in step 810, the local node stops all OTA transmissions (e.g., LNI messages) and in step 820 it compares its battery level with the dead (third) threshold. If the battery level is greater than (or equal to) the dead threshold, in step 822 the local node forwards data from its downstream nodes to a selected alternate upstream node without formally joining the network at that alternate upstream node through the join tree process. The local node selects the alternate upstream node from LNI messages that it receives, such as through promiscuous listening to RTS/CTS packets containing LNI. In step 840, the local node waits for a FORM_NETWORK command in step 840. If the local node determines that its battery level is less than the dead threshold, then in step 830, it transmits only its own local data to the upstream node and does not forward data received from its downstream nodes to the upstream node.

This virtual repair process is a temporary solution and the node performs the data routing/forwarding steps 822 and 830 until a FORM_NETWORK command is received. The virtual local repair method makes the node with a low battery forward its data to the C2 node immediately without additional battery power consumption (e.g., transmission of LNI messages, etc.). The majority of the traffic is from the sensor node to the C2 node and the virtual local repair is the last ditch method.

If the local node positions are available in the sub-tree LSA messages, the C2 node knows where the critical node(s) is located that requires replacement. Then, the relay node will replace the battery-depleted node in response to a C2 command. Alternatively, the C2 moves to a better location so that it prevents network partitioning until a relay node can take over.

To summarize the process represented by FIGS. 5-8, when a node determines that communication between it and its upstream node is compromised (e.g., lost, not working properly, etc.), the node broadcasts a repair (first) message to inform its downstream nodes that a repair process is underway, and initiates a link between the node and another node in the network in a manner dependent on the power availability of the node.

Adaptive Activity Timer

Reference is now made to FIG. 2 in conjunction with FIGS. 3 and 6. When a local node does not have any data to/from the link layer in a pre-defined time interval defined by an activity timer value, then the link layer 214 sends a "Sleep Request" to the intranet layer 212 residing in the GPP 210. The handshaking between DSP 220 and GPP 210 prior to going to sleep ensures that the DSP 220 goes to sleep after the GPP 210. Current techniques provide that the pre-defined activity timer is identical for all UGS nodes. A consequence of this is that fragmented networks may be created in the tree routes (FIG. 6).

To overcome this problem, an adaptive activity timer value for a local node is provided that is based on the ratio of the maximum number of hops to the C2 node and the number of hops from the C2 node of the local node:

$$\text{InactivityTimer} = (\text{Max Number of Hops To C2/Number of Hops To C2}) * (\text{Pre-defined Time}) \quad (2)$$

For example, nodes R6, R7, R8, R9 and R10 are each 3 hops away from the C2 node, and therefore have a shorter InactivityTimer value and go to sleep sooner than nodes R3, R4 and R5 which are 2 hops from the C2 node, and so on. This adaptive activity timer avoids fragmentation of UGS networks by ensuring that the nodes farther away from C2 nodes go to sleep sooner than nodes closer to C2. The adaptive activity timer can be applied when messages are propagated to leaf nodes. The command message is broadcasted and followed by a waiting period until the leaf nodes hear it before perform the actual event. For example, the C2 node may broadcast that it is leaving the network (by transmitting a C2_LEAVE message) but it waits a period of time sufficient to allow the nodes receive the message prior to actually leaving the network.

Thus, the adaptive activity timer is a method for controlling the status of a node in a wireless sensor network, that causes the node to enter a lower power consumption state when the node has no data to transmit for a time period since a previous data transmission is greater than or equal to an activity timer value that is based on a number of node hops between the node and a main node that serves as a sink for data from the nodes. The activity timer value may be adjusted (re-computed) after a change occurs in the number of node hops between the node and the main node.

Adaptive Refresh Timer

Reference is made to FIGS. 6 and 7. When a route is changed, each node sends an updated net formation (LSA) message (also called routing update information) to the upstream node after expiration of the refresh timer. See, for example, step 626 in FIG. 7. A pre-defined refresh timer that is the same for all nodes causes the transmission of unnecessary frequent LSA messages in the UGS network.

To avoid these unnecessary OTA messages, an adaptive refresh timer is provided:

$$\text{RefreshTimer} = (\text{Number of Hops To C2}) * (\text{Pre-defined Refresh Time}) \quad (3)$$

Thus, the refresh timer value for a local node depends on the number of node hops between the local node and the C2 node, and more specifically, local nodes farther from the C2 node have a longer refresh timer than nodes closer to the C2 node. As an example, this adaptive refresh timer ensures that R3 (2 hops to C2) has a sufficiently long refresh time so that it combines the LSA messages from its downstream nodes {R6, R7 and R8} before R1 (one hop away from C2) updates its LSA to C2. The adaptive refresh timer together with the adaptive activity timer makes the UGS going-to-sleep process robust and propagates the topology information with minimum number of OTA control messages.

The adaptive refresh timer is a method of controlling when a node in a wireless sensor network transmits routing update information to other nodes in the network, by causing the node to transmit route update information to other nodes after a routing change has occurred and a time period greater than or equal to refresh timer value subsequent the routing change, wherein the refresh timer value is based on a number of node hops between the node and a main node that serves as a sink for data from the nodes. The refresh timer value may be adjusted (re-computed) after a change occurs in the number of node hops between the node and the main node.

Performance Analysis

The 11-node scenario shown in FIG. 6 was used for perform probabilistic analysis. The UGS network is initially in the sleep state and the C2 node commands the network formation as follows. The C2 node transmits the C2 wakeup signal, followed by the LNI message for time synchronization. It then begins the join tree process and LSA messages are transmitted to form a UGS network.

A comparison is made of the number of OTA messages needed to repair a network using the conventional protocol versus the energy-efficient techniques described herein. A global repair with the "Re-Org" process is used as a representation of the conventional process.

Scenario

FIG. 6 illustrates a local repair by node R3. As described above, the probability of participating in a data transmission process is higher for R1 because it has more downstream nodes than the R2 (assuming the R4 is associated with the R1). Therefore, R1 could deplete its battery power sooner. When R3 detects a broken link with its upstream node R1, the conventional repair method would require R1 to transmit a "Re-Org" message to the C2 node to initiate a "FORM_NETWORK" command. This global "Re-Org" is very expensive in terms of energy use because all nodes must re-associate.

By contrast, using the techniques described herein, the following local repair process will occur to avoid the unnecessary global repair. The battery levels of all nodes, except R1 and R3, are assumed to be greater than the soft threshold. Also, it is assumed that R1 refuses to forward the data from its sub-tree, such as from node R3. The R3 node knows that R4 is an alternate route (through "promiscuous listening" to other data traffic and LNI messages), and attempts a local repair (real or virtual depending on the battery level of R3) to the R4 node. The changed sub-tree information is transmitted to the C2 node after the adaptive refresh timer expires to avoid frequent LSA transmission. If R3's battery level is less than the soft threshold, but greater than the hard threshold, R3 broadcasts the resign message and starts the local repair based on its battery level, as described above in connection with FIGS. 8 and 9.

Figure 10:
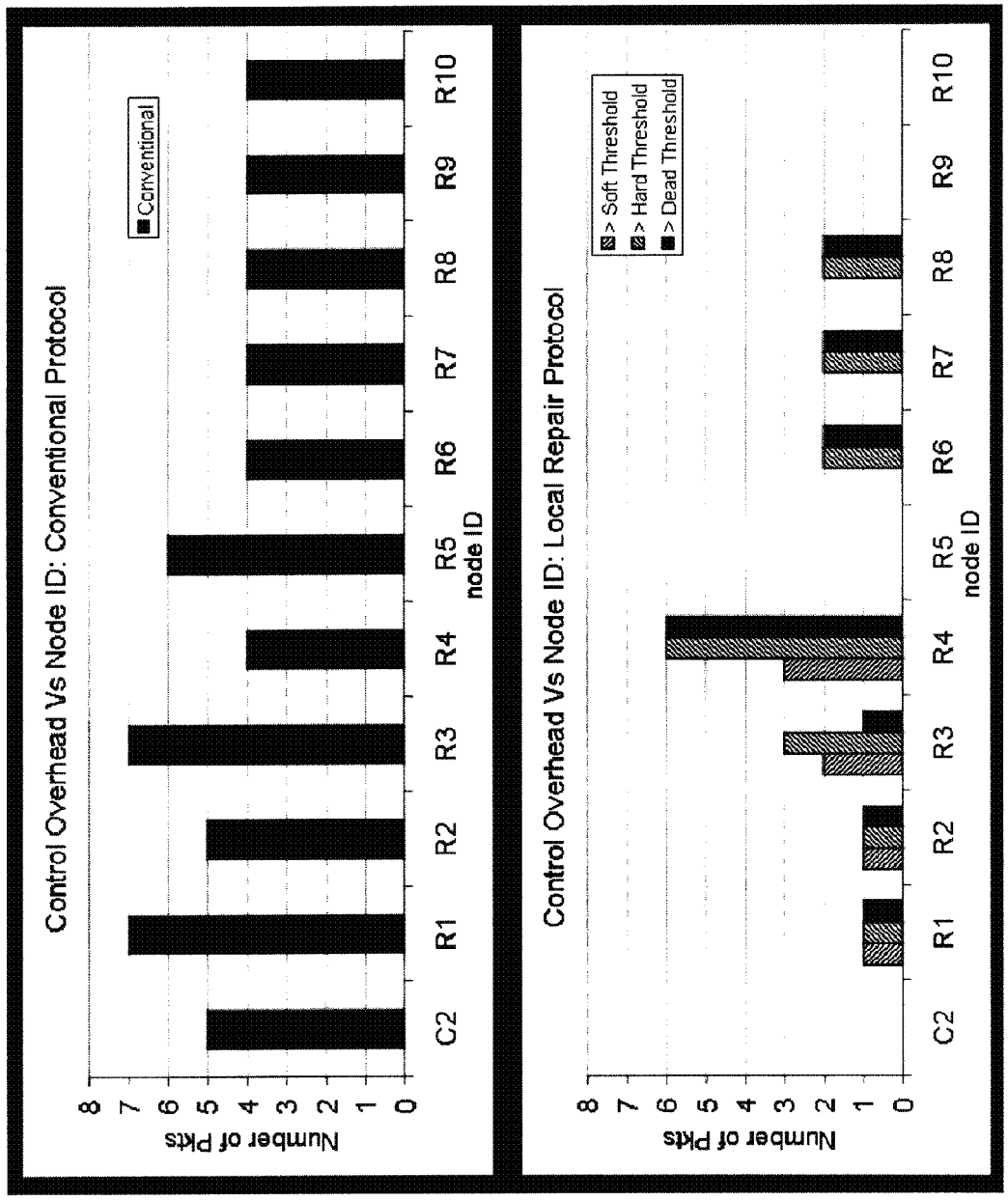
FIG. 10 shows bar charts that illustrate the advantages of the techniques described herein.

FIG. 10 lists the number of OTA control message transmissions to repair the routing path for the network topology shown in FIG. 6. Using the conventional method, the "Re-Org" message is initiated by R3. Upon receiving the "Re-Org" message, C2 transmits the wake-up signal and re-broadcasts the "Re-Org" message, followed by the net formation command. All nodes re-broadcast the "Re-Org" messages and perform the normal net formation process. When the JOIN_REQUEST message is received, then C2 responds with a JOIN_ACK message to R1 and R2. Thus, C2 sends 5 OTA messages. Similarly, R1 transmits 7 OTA messages {"Re-Org", JOIN_REQUEST, 2 JOIN_ACK, 2 LSA and LNI}. All nodes perform the net formation process again.

For the local repair scenario it is assumed that R3 broadcasts the resign message and joins to R4, which selects the upstream node R2 (instead of R1). R3 determines how to perform the local repair based on its battery level with respect to the three thresholds: soft threshold, hard threshold and dead threshold. When R3's battery level is greater than the soft threshold, the local repair only impacts nodes R1, R2, and R4 in the proximity of R3 as expected. The number of control messages is much less than would generated by the conventional "Re-Org" technique. When R3's battery level is less than the soft threshold, but greater than the hard threshold, R3 broadcasts the resign message and allows its sub-tree nodes R6, R7 and R8 to re-associate with R4. R4 generates 6 control messages (JOIN_REQUEST, 3 JOIN_ACK, LSA and LNI). The leaf nodes R6, R7, and R8 generate 2 control messages (JOIN_REQUEST and LSA) in that case. The virtual local repair is the last resort to conserve local node R3's battery level.

To summarize, a method is provided for forming a wireless network comprised of a plurality of nodes that transmit and receive information between each other and ultimately to a main node in a tree-like configuration, comprising receiving at a second information that indicates data routing responsibility of a first; and determining at the second node whether to join the network at the first node based on the information received from the first node. The terms first node and second node are generic terms used to distinguish two nodes from each other, but it should be understood that they can be any two arbitrary nodes in the network. The first node is a node that is already associated with the network and is therefore an upstream node with respect to the second node. The second node is a node that has not yet associated with the network or desires to change which node it associates with in the network.

Similarly, a sensor node device is provided comprising a radio transceiver and a processor, wherein the processor processes information received from another node device, wherein the information indicates the data routing responsibility of the other node device, and wherein the processor determines whether to join the network at the other node device based on the information.

In addition, a method is provided for changing routing responsibilities for a node in a wireless network comprised of a plurality of nodes that transmit and receive information between each other and ultimately to a main node in a tree-like configuration, comprising: broadcasting a first message from the node when the node determines that communication between it and its upstream node is compromised, wherein the first message informs downstream nodes associated with the node that a repair process is underway; and initiating a link between the node and another node in the network in a manner dependent on the power availability of the node.

Similarly, a sensor node device is provided comprising a radio transceiver and a processor, wherein the processor generates a first message (repair message) for broadcasting from the node when it determines that communication between the node and its upstream node is compromised, wherein the first message informs downstream nodes associated with the node that a repair process is underway; and initiating a link between the node and another node in the network in a manner dependent on the power availability (battery level) of the node.

The system and methods described herein may be embodied in other specific forms without departing from the spirit or essential characteristics thereof. The foregoing embodiments are therefore to be considered in all respects illustrative and not meant to be limiting.

What is claimed is:

1. A method for changing routing responsibilities for a node in a wireless network comprised of a plurality of nodes that transmit and receive information between each other and ultimately to a main node in a tree-like configuration, comprising:
   a. at the node in the wireless network, broadcasting a first message from the node to downstream nodes associated with the node when the node determines that communication between it and an upstream node associated with the node is compromised, wherein the first message informs the downstream nodes associated with the node that a repair process is underway, wherein the downstream nodes are downstream from the node and downstream from the main node, and wherein the upstream node is downstream from the main node and upstream from the node;
   b. selecting, at the node, the repair process from a full repair process and a virtual repair process, wherein the selection between the full repair process and the virtual repair process is dependent on a power availability of the node and comprises comparing power availability of the node with a threshold, and selecting the full repair process if the power availability is greater than the threshold;
   c. initiating, via the node, the repair process, wherein the repair process comprises establishing a link between the node and another node in the network in a manner dependent on the power availability of the node and attempting to join the network at a different node to establish communication between the node and the upstream node associated with the node through the different node;
   d. broadcasting a second message from the node when attempts to join the network at other upstream nodes fail and when the power availability of the node is less than the threshold, wherein the second message alerts the downstream nodes associated with the node to establish communication with other nodes in the wireless network, and wherein the second message informs the downstream nodes associated with the node that the node is resigning as an upstream node for the downstream nodes associated with the node;

e. receiving at a first downstream node associated with the node the second message from the node, and in response thereto, when the first downstream node has no downstream nodes associated with it, attempting to join the different node in the wireless network to establish communication between the first downstream node associated with the node and the upstream node associated with the node through the different node;

f. receiving at the first downstream node one or more messages from other nodes that are candidate upstream nodes for the first downstream node, wherein the messages include information indicating data routing responsibility for the corresponding candidate upstream node; and g. determining at the first downstream node to join the network at a candidate upstream node that has the least data routing responsibility among the candidate upstream nodes.

2. The method of claim 1, further comprising continuing to forward from the node data from its downstream nodes for a period of time sufficient to allow the downstream nodes to join at other nodes in the wireless network.

3. The method of claim 1, wherein comparing comprises comparing the power availability with a first threshold, and if the power availability is less than the first threshold, then further comprising comparing the power availability with a second threshold that is less than the first threshold.

4. The method of claim 3, wherein broadcasting comprises broadcasting the first message when the power availability is less than the first threshold but greater than or equal to the second threshold.

5. The method of claim 3, wherein when the power availability of the node is less than the second threshold, further comprising terminating all over-the-air transmissions, and comparing the power availability with a third threshold that is less than the second threshold.

6. The method of claim 5, wherein when the power availability of the node is less than the third threshold, further comprising transmitting to another node only data local to the node.

7. The method of claim 5, wherein when the power availability of the node is greater than or equal to the third threshold, further comprising forwarding data received at the node from the downstream nodes associated with the node to another node without formally joining the network at another node and becoming a downstream node for that other node.

8. The method of claim 1, and further comprising at the node terminating transmission of messages containing information indicating the data routing responsibility of the node.

9. A method for changing routing responsibilities for a node in a wireless network comprised of a plurality of nodes that transmit and receive information between each other and ultimately to a main node in a tree-like configuration, comprising:

a. at the node in the wireless network, broadcasting a first message from the node to downstream nodes associated with the node when the node determines that communication between it and an upstream node associated with the node is compromised, wherein the first message informs the downstream nodes associated with the node that a repair process is underway;

b. initiating the repair process, wherein the repair process comprises establishing a link between the node and another node in the network in a manner dependent on a power availability of the node;

c. comparing power availability of the node with a threshold, and attempting to join the network at a different node to establish communication between the node and the upstream node associated with the node through the different node if the power availability of the node is greater than the threshold;

d. broadcasting a second message from the node when attempts to join the network at other upstream nodes fail, wherein the second message alerts the downstream nodes associated with the node to establish communication with other nodes in the wireless network, and wherein the second message informs the downstream nodes associated with the node that the node is resigning as an upstream node for the downstream nodes associated with the node, wherein broadcasting the second message comprises broadcasting the second message when the power availability of the node is less than the threshold;

e. receiving at a first downstream node associated with the node the second message from the node, and in response thereto, when the first downstream node has no downstream nodes associated with it, attempting to join the different node in the wireless network to establish communication between the first downstream node associated with the node and the upstream node associated with the node through the different node;

f. receiving at the first downstream node one or more messages from other nodes that are candidate upstream nodes for the first downstream node, wherein the messages include information indicating data routing responsibility for the corresponding candidate upstream node; and g. determining at the first downstream node to join the network at a candidate upstream node that has the least data routing responsibility among the candidate upstream nodes.

10. A method for changing routing responsibilities for a node in a wireless network comprised of a plurality of nodes that transmit and receive information between each other and ultimately to a main node in a tree-like configuration, comprising:

a. at the node in the wireless network, broadcasting a first message from the node to downstream nodes associated with the node when the node determines that communication between it and an upstream node associated with the node is compromised, wherein the first message informs the downstream nodes associated with the node that a repair process is underway, wherein the downstream nodes are downstream from the node and downstream from the main node, and wherein the upstream node is downstream from the main node and upstream from the node;

b. selecting, at the node, the repair process from a full repair process and a virtual repair process, wherein the selection between the full repair process and the virtual repair process is dependent on a power availability of the node and comprises comparing power availability of the node with a threshold, and selecting the full repair process if the power availability is greater than the threshold;

c. initiating, via the node, the repair process, wherein the repair process comprises establishing a link between the node and another node in the network in a manner dependent on the power availability of the node and attempting to join the network at a different node to establish communication between the node and the upstream node associated with the node through the different node;
d. broadcasting a second message from the node when attempts to join the network at other upstream nodes fail and when the power availability of the node is less than the threshold, wherein the second message alerts the downstream nodes associated with the node to establish communication with other nodes in the wireless network, and wherein the second message informs the downstream nodes associated with the node that the node is resigning as an upstream node for the downstream nodes associated with the node;
e. receiving at a first downstream node associated with the node the second message from the node, and in response thereto, when the first downstream node has no downstream nodes associated with it, attempting to join the different node in the wireless network to establish communication between the first downstream node associated with the node and the upstream node associated with the node through the different node;
f. receiving at the first downstream node one or more messages from other nodes that are candidate upstream nodes for the first downstream node, wherein the messages include information indicating data routing responsibility for the corresponding candidate upstream node; and
g. receiving at a second downstream node the second message from the node, and broadcasting a third message from the second downstream node to alert its respective downstream nodes to attempt to join the network at another node in the network.

11. A method for changing routing responsibilities for a node in a wireless network comprised of a plurality of nodes that transmit and receive information between each other and ultimately to a main node in a tree-like configuration, comprising:
a. at the node in the wireless network, broadcasting a first message from the node to downstream nodes associated with the node when the node determines that communication between it and an upstream node associated with the node is compromised, wherein the first message informs the downstream nodes associated with the node that a repair process is underway;
b. initiating the repair process, wherein the repair process comprises establishing a link between the node and another node in the network in a manner dependent on a power availability of the node;
c. comparing power availability of the node with a threshold, and attempting to join the network at a different node to establish communication between the node and the upstream node associated with the node through the different node if the power availability of the node is greater than the threshold, wherein comparing comprises comparing the power availability with a first threshold, and if the power availability is less than the first threshold, then further comprising comparing the power availability with a second threshold that is less than the first threshold;
d. terminating all over-the-air transmissions when the power availability of the node is less than the second threshold, and comparing the power availability with a third threshold that is less than the second threshold; and
e. transmitting to another node only data local to the node when the power availability of the node is less than the third threshold; wherein transmitting comprises transmitting to another node only data local to the node on a temporary basis until reorganization of the network occurs.

12. A method for changing routing responsibilities for a node in a wireless network comprised of a plurality of nodes that transmit and receive information between each other and ultimately to a main node in a tree-like configuration, comprising:
a. at the node in the wireless network, broadcasting a first message from the node to downstream nodes associated with the node when the node determines that communication between it and an upstream node associated with the node is compromised, wherein the first message informs the downstream nodes associated with the node that a repair process is underway, wherein the downstream nodes are downstream from the node and downstream from the main node, and wherein the upstream node is downstream from the main node and upstream from the node;
b. selecting, at the node, the repair process from a full repair process and a virtual repair process, wherein the selection between the full repair process and the virtual repair process is dependent on a power availability of the node and comprises comparing power availability of the node with a first threshold, and if the power availability is less than the first threshold, comparing the power availability with a second threshold that is less than the first threshold, and if the power availability is less than the second threshold, then comparing the power availability with a third threshold that is less than the second threshold;
c. when the power availability of the node is less than the second threshold, terminating all over-the-air transmissions;
d. when the power availability of the node is greater than or equal to the third threshold, forwarding data received at the node from the downstream nodes associated with the node to another node without formally joining the network at another node and becoming a downstream node for that other node, wherein forwarding comprising forwarding data to another node on a temporary basis until reorganization of the network occurs; and
e. initiating, via the node, the repair process, wherein the repair process comprises establishing a link between the node and another node in the network in a manner dependent on the power availability of the node.

13. A method for changing routing responsibilities for a node in a wireless network comprised of a plurality of nodes that transmit and receive information between each other and ultimately to a main node in a tree-like configuration, comprising:
a. at the node in the wireless network, broadcasting a first message from the node to downstream nodes associated with the node when the node determines that communication between it and an upstream node associated with the node is compromised, wherein the first message informs the downstream nodes associated with the node that a repair process is underway, wherein the downstream nodes are downstream from the node and downstream from the main node, and wherein the upstream node is downstream from the main node and upstream from the node;
b. selecting, at the node, the repair process from a full repair process and a virtual repair process, wherein the selection between the full repair process and the virtual repair process is dependent on a power availability of the node and comprises comparing power availability of the node with a first threshold, and if the power availability is less than the first threshold, then comparing the power availability with a second threshold that is less than the first threshold, and if the power availability is less than the second threshold comparing the power availability with a third threshold that is less than the second threshold;

c. when the power availability of the node is less than the second threshold, terminating all over-the-air transmissions d. when the power availability of the node is less than the third threshold, transmitting to another node only data local to the node on a temporary basis until reorganization of the network occurs; and e. initiating, via the node, the repair process, wherein the repair process comprises establishing a link between the node and another node in the network in a manner dependent on the power availability of the node and attempting to join the network at a different node to establish communication between the node and the upstream node associated with the node through the different node.

* * * * *